(12) United States Patent
Kochanowicz et al.

(10) Patent No.: US 6,250,795 B1
(45) Date of Patent: Jun. 26, 2001

(54) VALVE DISPOSITION AND CONFIGURATION DESIGNED TO IMPROVE COLOR DOSING RESPONSE TIME IN A PROCESS OF COLORING POLYURETHANE PRODUCTS

(75) Inventors: Christopher T. Kochanowicz; Jimmy D. Chavis, both of Spartanburg; F. Mark Pitman; Mark E. Ragsdale, both of Duncan, all of SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/736,696

(22) Filed: Dec. 13, 2000

Related U.S. Application Data

(62) Division of application No. 09/335,197, filed on Jun. 17, 1999.

(51) Int. Cl.$^7$ .................. B01F 5/04; B01F 15/02
(52) U.S. Cl. .................. 366/182.4; 366/159.1; 366/173.1
(58) Field of Search .................. 366/159.1, 162.1, 366/162.4, 162.5, 167.1, 173.1, 173.2, 182.4, 348; 422/133–135; 251/315.01–317.01; 137/247.21, 247.23, 247.27, 602, 627, 896, 897

(56) References Cited

U.S. PATENT DOCUMENTS

| | | | |
|---|---|---|---|
| 1,661,431 | * | 3/1928 | Leibing . |
| 2,767,737 | * | 10/1956 | Turak . |
| 3,115,896 | * | 12/1963 | Roberts et al. . |
| 3,347,267 | * | 10/1967 | Inman . |
| 3,516,638 | * | 6/1970 | Piggott . |
| 3,857,550 | * | 12/1974 | Knipp et al. . |
| 3,896,848 | * | 7/1975 | Sypitkowski . |
| 4,099,919 | * | 7/1978 | Leidal . |
| 4,281,935 | * | 8/1981 | Cramer et al. .................. 137/897 |
| 4,284,729 | * | 8/1981 | Cross et al. . |
| 4,442,047 | * | 4/1984 | Johnson .................. 137/897 |
| 4,452,919 | * | 6/1984 | Schneider . |
| 4,708,158 | * | 11/1987 | Akamatsu . |
| 4,721,391 | * | 1/1988 | Bauer . |
| 5,082,633 | * | 1/1992 | Stuper . |
| 5,261,741 | * | 11/1993 | Hladis . |
| 5,270,013 | * | 12/1993 | Decker . |
| 5,305,986 | * | 4/1994 | Hunt . |
| 5,445,187 | * | 8/1995 | Farquhar . |
| 5,913,324 | * | 6/1999 | Signer .................. 137/897 |
| 5,988,220 | * | 11/1999 | Sakaki . |
| 6,079,867 | * | 6/2000 | Fiorentini et al. . |

\* cited by examiner

Primary Examiner—Charles E. Cooley
(74) Attorney, Agent, or Firm—Terry T. Moyer; William S. Parks

(57) ABSTRACT

This invention relates to an improved procedure and apparatus for making colored polyurethane foam products, such as carpet underlay and the like, as well as the improved colored product itself. Such a procedure entails the utilization of at least one valve assembly within a color dosing manifold such that the valve itself is simultaneously in contact with both the outside surface and the inside surface of the manifold. Such a disposition for a valve assembly permits color to be introduced directly into a binder (i.e., polyol and isocyanate) or polyol stream in order to substantially eliminate any color remaining in contact solely with the inside walls of the manifold. This in turn permits thorough mixing of the binder and colorant and substantially reduces the response time from opening the valve to producing colored polyurethane materials (such as polyurethane foam), thereby effectively eliminating the production of waste polyurethane product. The inventive configuration comprising a specific type of ball valve and/or the placement of a plurality of such disposed valves in a radial configuration on the manifold are also contemplated within the invention.

15 Claims, 5 Drawing Sheets

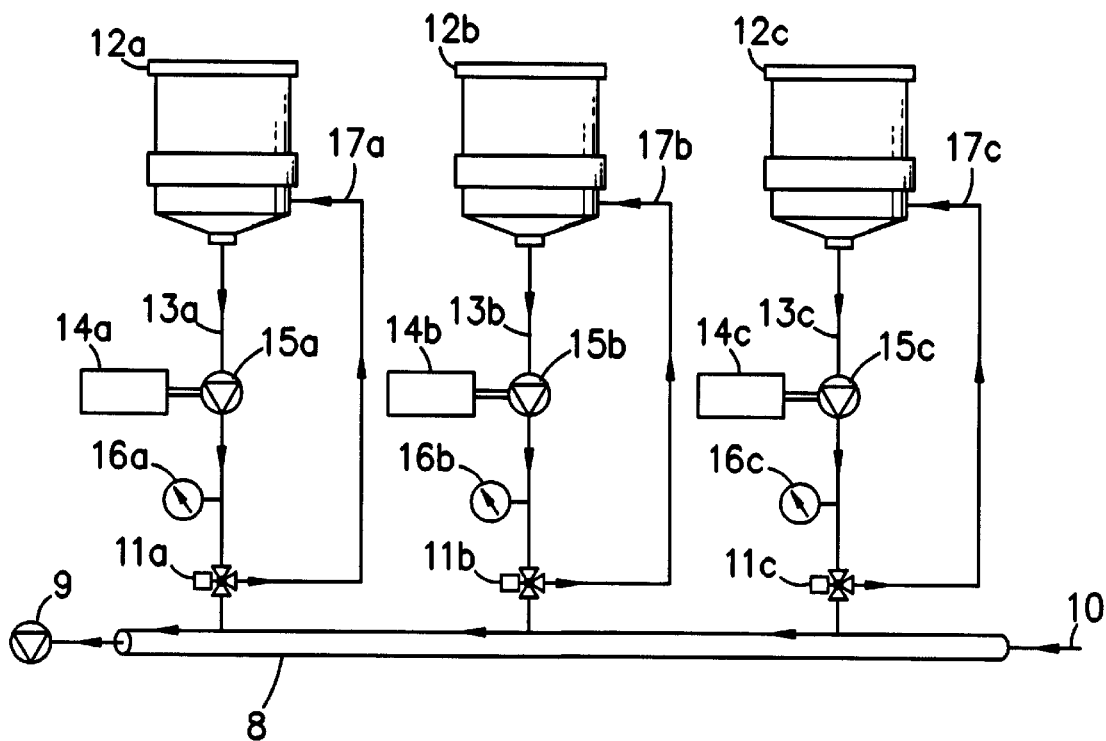
FIG. -1-
PRIOR ART

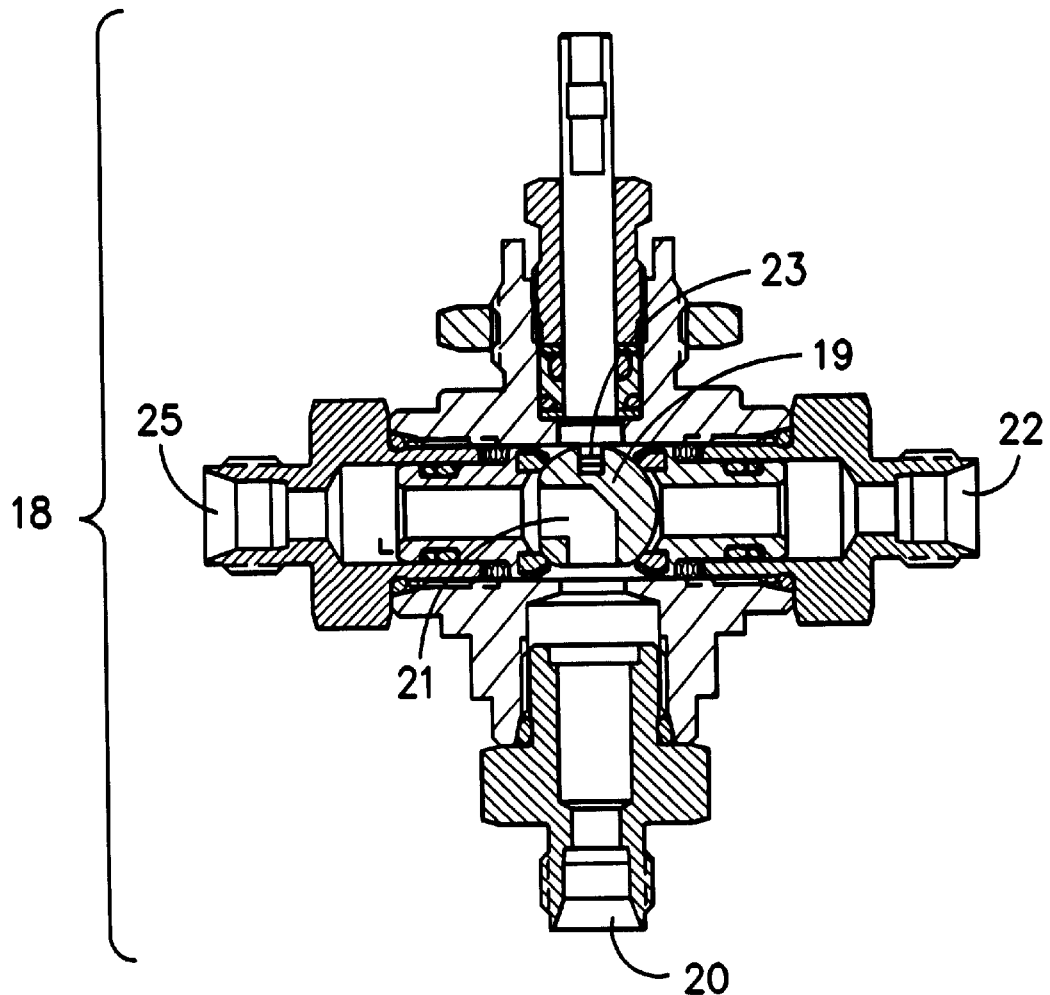
FIG. -2-
PRIOR ART

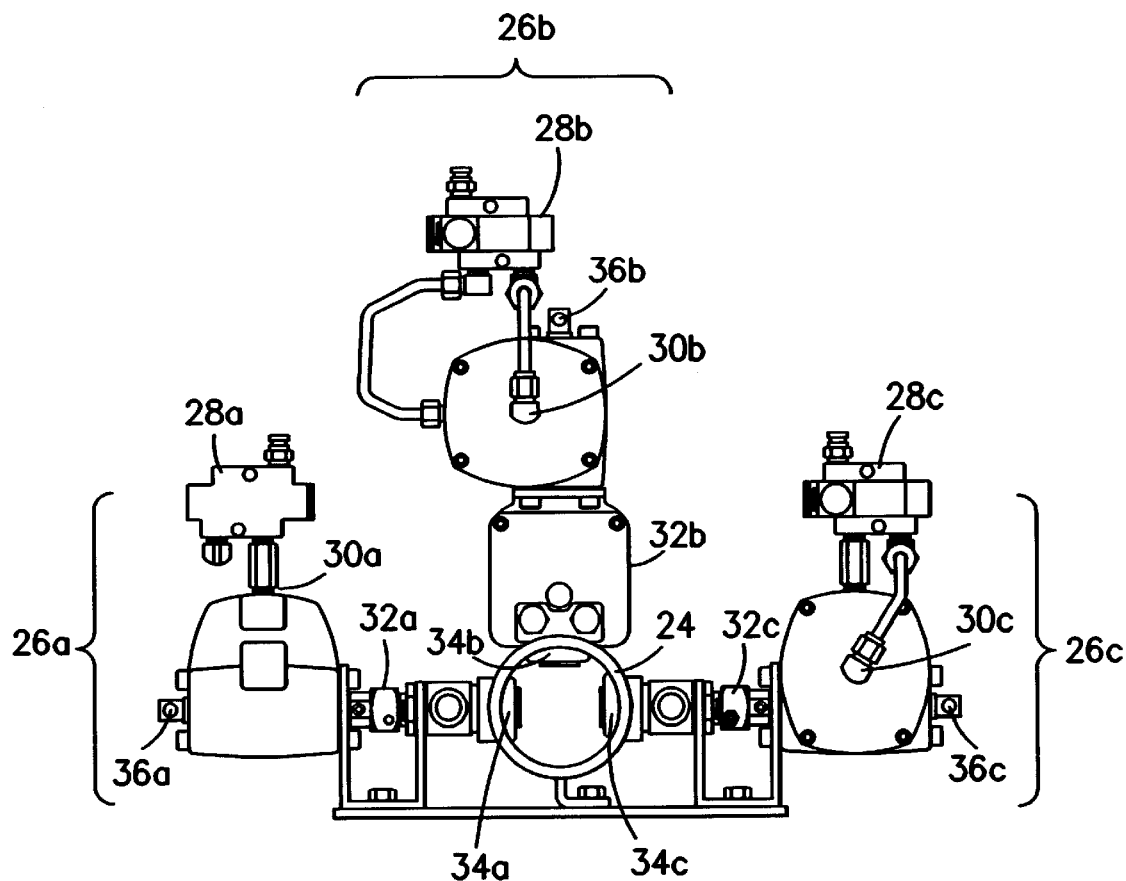
FIG. -3-

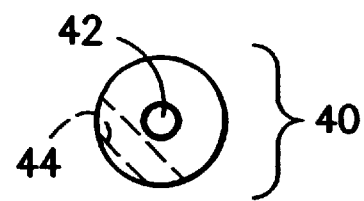
FIG. -4-
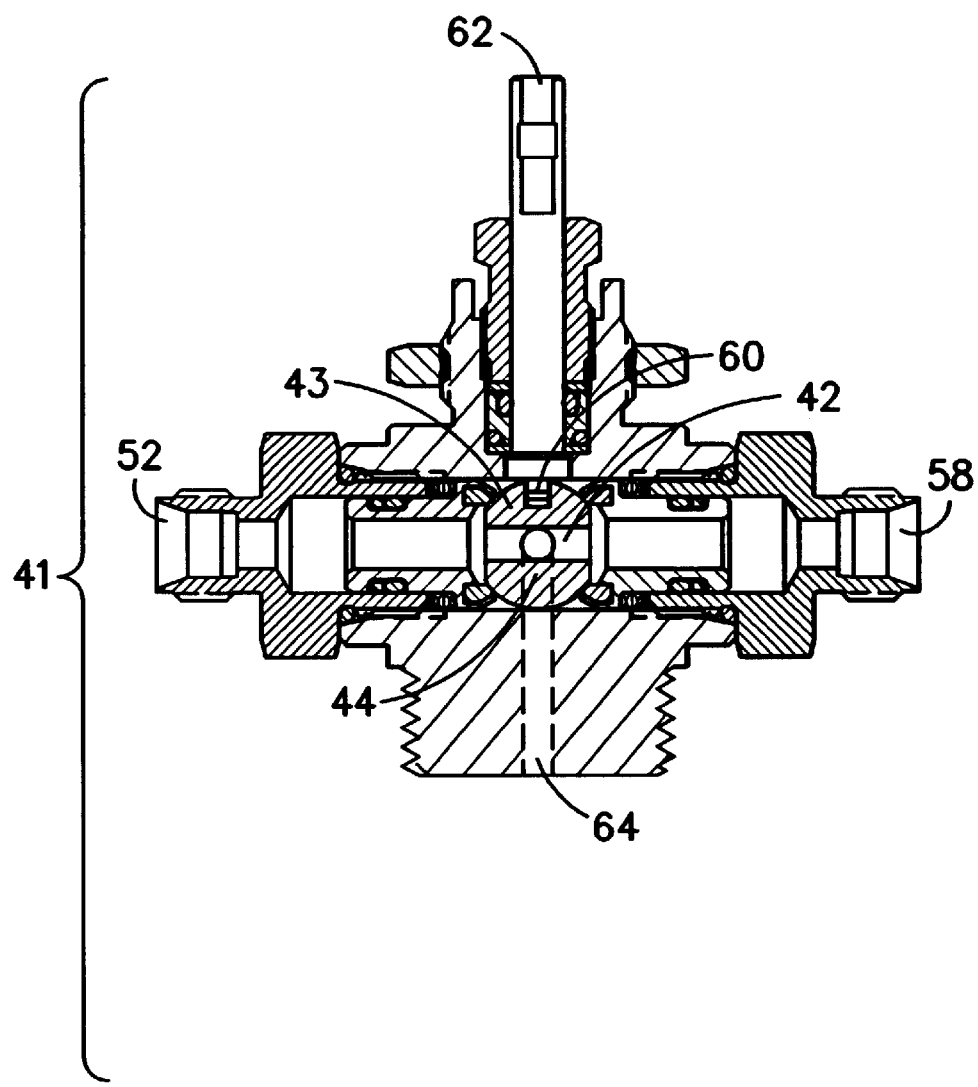
FIG. -5-

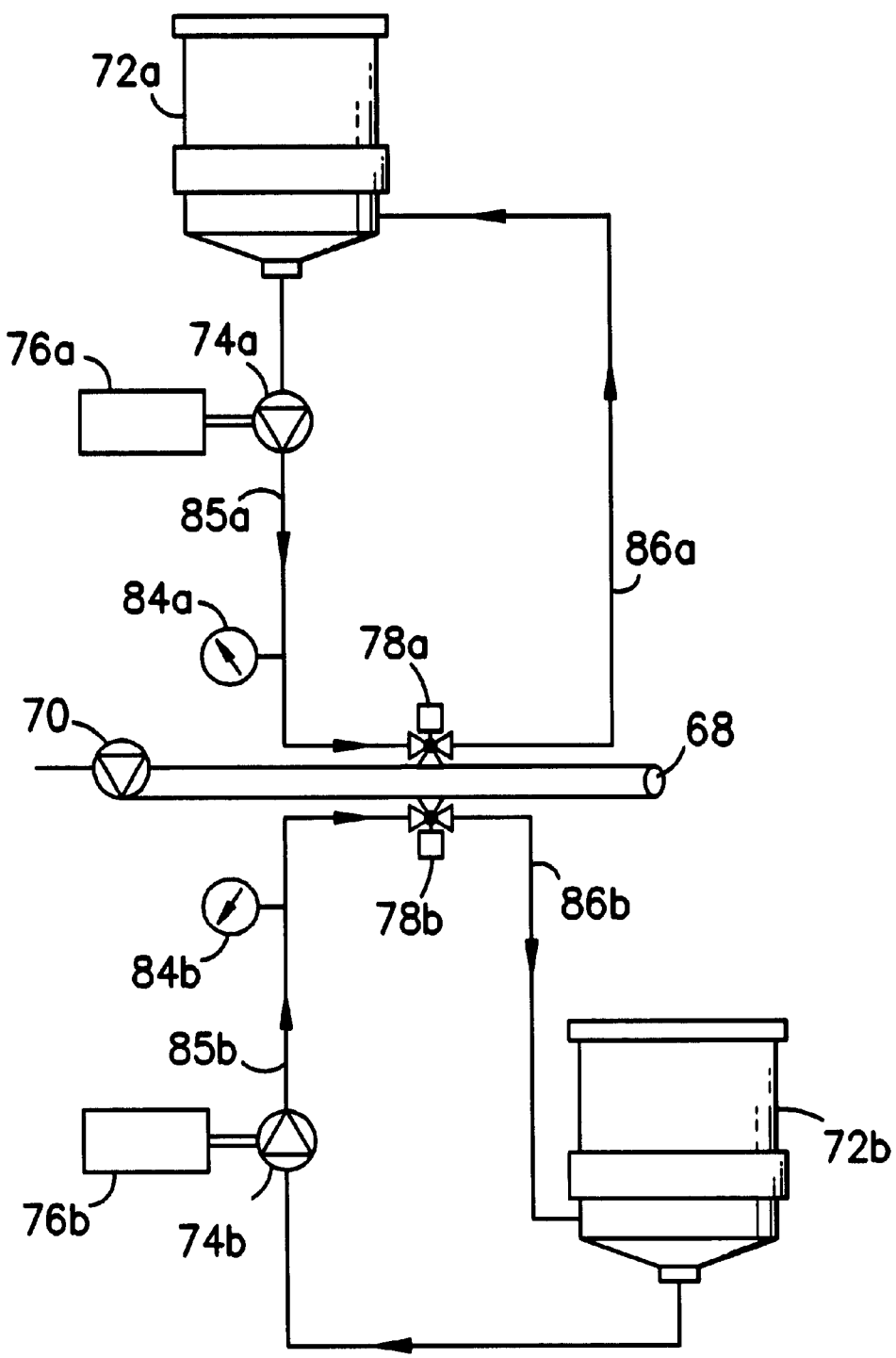
FIG. —6—

VALVE DISPOSITION AND CONFIGURATION DESIGNED TO IMPROVE COLOR DOSING RESPONSE TIME IN A PROCESS OF COLORING POLYURETHANE PRODUCTS

CROSS REFERENCE TO RELATED APPLICATIONS

This application is a divisional of co-pending application Ser. No. 09/335,197, filed on Jun. 17, 1999.

FIELD OF THE INVENTION

This invention relates to an improved procedure and apparatus for making colored polyurethane foam products, such as carpet underlay and the like, as well as the improved colored product itself. Such a procedure entails the utilization of at least one valve assembly within a color dosing manifold such that the valve itself is simultaneously in contact with both the outside surface and the inside surface of the manifold. Such a disposition for a valve assembly permits color to be introduced directly into a binder (i.e., polyol and isocyanate) or polyol stream in order to substantially eliminate any color remaining in contact solely with the inside walls of the manifold. This in turn permits thorough mixing of the binder and colorant and substantially reduces the response time from opening the valve to producing colored polyurethane materials (such as polyurethane foam), thereby effectively eliminating the production of waste polyurethane product. The inventive configuration comprising a specific type of ball valve and/or the placement of a plurality of such disposed valves in a radial configuration on the manifold are also contemplated within the invention.

BACKGROUND OF THE INVENTION

Polyurethane foam carpet underlay products are utilized to provide cushioning benefits for pedestrians since carpet is usually placed over hard floors, such as concrete or wood. Such carpet underlay thus should provide a uniform and even cushioning effect over the entire covered area. Furthermore, there are certain aesthetic qualities which are demanded in the marketplace for such carpet underlay products as concerns colorations and appearances. These demands have been met in the past through the utilization and introduction of colorants through one or more pipes or injectors, arranged consecutively and serially (if a plurality is present), through connections (feed lines, etc.) feeding to a manifold, and ultimately into binder compositions comprising the standard polyurethane reactants (polyols, such as ether triols, and the like, and isocyanates, such as methyl diphenyl diisocyanate, and the like, as merely examples; any standard polyol and isocyanate utilized to produce polyurethane in this industry may be used). The pipes or valve assemblies have been disposed in the past by merely creating a hole in the manifold to which the pipe or valve assembly is attached. The colorant would then be fed (by pressure or gravity, for instance) through the pipe or valve assembly and emptied into the binder stream travelling through the manifold. These colored compositions are generally mixed by a binder pump and sprayed onto scrap foam to form the desired carpet underlay product. Such a standard method has proven inefficient and problematic in the past since the through-pressure of the travelling binder stream is not always constant and thus the mere introduction at the walls of the manifold has not provided sufficient ability to thoroughly mix the colorant within the binder stream (in fact, the colorant remains in contact with the manifold wall rather than being "injected" into middle of the binder stream). This procedure thus leads to uneven coloring, discolorations, coagulation of binder and colorant, and the production of undesirable and potentially costly waste foam.

As a result, the demand for the introduction of a wide variety of colors in binder compositions for the production of polyurethane foam carpet underlay products has resulted in a significant move to blend-on-fly color dosing units based on the use of polymeric colorants. In this case color metering equipment is used to accurately dose two or more colors that are injected into the polyol stream and subsequently mixed in a binder pump to provide the correct shade and depth of color. The biggest advantage of this type of approach is that now an unlimited number of colors can be made from 1 to 5 "primary" colors blended on-the-fly. For example, a typical colored polyurethane product, carpet underlay, is colored and produced through a system based upon a binder/colorant shot process (i.e., color is introduced simultaneously with the start of a binder pump and stops when the pump is shut off, thus eliminating the introduction of additional color into the manifold). Changes from light and/or dark shades and color changes from one hue to another can be accomplished with a minimal amount of binder flush through the manifold thus reducing the amount of off-quality foam produced during the color change procedure. Thus, changes from one dark color to the next can usually be accomplished in relatively short distances minimizing the amount of foam that must be scrapped as a result of the color change. Light shades have proven to be more of a challenge since the color throughput is substantially lower causing the response time to increase before changes actually made in the system can take effect. As a result, a means was needed to reduce this response time to an acceptable level thus minimizing the length of time required to change from one color to the next even at low flow rates (approaching 2 grams per minute or less.)

A means was also needed to produce even colorations in the final product, as well as to possibly reduce the amount of coagulated binder/colorant (that is coagulated or crystallized portions of the colorant combined with the polyol and the isocyanate of the binder composition). Such a coagulant theoretically produces patches or areas of "hardness" within the carpet underlay product. As such a product desirably provides a uniformly cushioned, soft feel as a layer between the carpet and the hard floor underneath, any coagulated binder/colorant will produce unwanted, deleterious areas of "hardness."

Thus, it was necessary to develop a configuration and/or utilize, within this specific configuration, a specific valve assembly in order to facilitate effective on-the-fly polymeric colorant blending with even colorations in the final product and substantially reduced, if not eliminated, binder/colorant coagulant production. To do this it was first necessary to realize that the current standard configuration utilized either a single colorant "injector" (i.e., pipe, valve, etc.) on the dosing manifold, or a plurality of "injectors" aligned consecutively and serially on the manifold (i.e., one after the other), such that the "injectors" would merely be used to transfer colorant to a location in very close proximity to the manifold inner wall. Such a limited manner of "injecting" colorant resulted in the problems discussed above since the colorant would not become thoroughly mixed and, in conjunction with the laminar flow of the binder through the manifold, would basically remain in contact with the manifold rather than become thoroughly mixed within the binder stream. Thus, it was reasoned that the main problem with the traditional method of producing polyurethane foam could be alleviated through the utilization of a newly modified valve assembly which extends within the actual manifold rather than remains at a location outside the manifold. Accordingly, this invention provides apparatus for the production of polyurethane foam carpet underlay comprising a mechanism for the introduction of colorant within a binder composition; wherein said apparatus comprises a manifold comprising an inside surface and an outside surface, within which said binder composition and said colorants are mixed together, which leads to a binder pump; wherein said apparatus comprises at least one valve assembly through which said colorants are transferred from a feed line to said manifold; and wherein said at least one valve assembly is disposed within said manifold such that said at least one valve assembly is simultaneously in contact with both said outside surface and said inside surface of said manifold.

Furthermore, in other polyurethane producing procedures, colorants have traditionally been added strictly to the polyol component prior to its ultimate reaction with isocyanate to form the target polyurethane article (such as foam, carpet underlay, car bumpers, and the like). However, such formulators do not always produce colored polyol compositions since uncolored foam products are also desired by consumers. Thus, the polyol producer generally mixes and formulates the desired polyol/colorant compositions and ships such to its customer polyurethane producer. Polyol production generally is performed in a single dedicated mixing vessel for cost purposes. If a batch of polyol is to be colored, the formulator must thoroughly mix the polyol and colorant constituents in such a vessel. However, should a further polyol composition need to be produced without added colorant, the mixing vessel must be thoroughly cleaned after each production of polyol/colorant composition (especially when pigments are utilized). This cost-cutting thus has translated into limited choices of color since the formulator generally produces either uncolored or a single color of polyol (such as black, from a black pigment). Additionally, the color response time from the dispensing of colorant to the clear introduction of colorant within the target polyol composition is generally is very high with the systems now in use (i.e., valve assemblies attached to the outside of a manifold which introduce colorant into the manifold at the surface of the inner wall). For instance, and merely as one example, the following measurements were undertaken with the standard valve assemblies now utilized: Through a one inch manifold a polyol composition was pumped at about 466.5 grams per minute. Color was added at a rate of 11.1 grams per minute at an injection point eighteen inches from a standard gear pump followed by an additional eighteen inches of pipe from the discharge port on the pump to an outlet. Upon actuation of the valve assembly to a dispense mode, a total time of 35 seconds was required before colorant was located within the polyol composition past the outlet. However, when the inventive valve configuration was practiced, a total time of seventeen seconds passed prior to colorant realization in the polyol composition. Furthermore, upon switching the traditional valve assembly (which permits colorant to travel down the manifold inner walls) to recirculation mode (thereby preventing the introduction of more colorant within the manifold), a total time of 120 seconds was measured before colorant disappeared from the polyol final product. Upon use of the inventive valve assembly, a total time of between 25 and 30 seconds was necessary for a full depletion of colorant within the target polyol. Thus, clearly, the introduction of colorant into the center of the binder stream afforded both quicker starting times and ending times (and thus a substantial reduction in the production of waste polyurethane).

The inventive valve assembly configuration provides a vast improvement to polyol formulators and ultimate foam producers in permitting greater flexibility in color choices with the facilitation of potentially costly clean-up efforts since the new valve-added manifold permits the manufacture of all uncolored polyol compositions within the formulator's mixing vessel. The colorant can then be added directly to the polyol in its final shipping container through the utilization of the inventive valve/manifold assembly by permitting thorough mixing of the colorant and polyol through the introduction of the colorant directly into the stream of polyol (binder) during the transfer of the polyol from the mixing vessel into the shipping container (tote bin, tank truck, and the like). Since the valve assembly "injects" the colorant into the center of the transferred binder stream, the colorant will not appreciably coat the walls of the manifold or remain stagnant within the manifold (and thus no coagulation will occur).

The particular valves may be of any structure themselves; however, preferred valves are specific ball valves which comprise two exclusive channels to permit instantaneous switching from dispense to recirculation mode which are discussed in greater detail below. Also, a preferred, but not required radial configuration of a plurality of valve assemblies on the manifold has proven to be most effective in providing thorough and highly desirable colorations through the mixing of different colorants within the binder stream itself. This effectiveness is most likely due to the nearly immediate response time to an actuator signal each valve allows since they are equidistant from the same mixing binder pump. Such a configuration is particularly suited for introducing (such as by injection) colorants into target binder compositions (comprising polyols) for the ultimate production of target polyurethane foam products (most importantly carpet underlay) thereby allowing for a substantial reduction in potential foam waste due to low colorations or discolorations. Furthermore, as noted above, such a radial configuration substantially reduces the binding together of excess colorant and binder which may produce unsightly and uncomfortable areas of "hardness" in the foam underlay. The resultant product was thus thoroughly and evenly colored and exhibited an even cushioning over the entire article.

In addition, and as noted above, it has been found that the inventive valve assemblies may also comprise specific types of ball valves which comprise two mutually exclusive channels running though perpendicular planes of the ball, one remaining in the same plane from entry through one side of the ball until exiting the opposite side, the other entering the ball at one axis, and exiting at a point 90° from the point of entry on a different axis. More particularly, the preferred ball valves utilized possess such mutually exclusive channels exhibiting the same bore sizes as well as the same bore sizes as the dispense port into the manifold. This ball valve facilitates quick and efficient movement of the valve from recirculation to dispense mode with minimal, if at all, leakage or loss of colorant. Such use of the ball valve also results in a rapid build up of pressure and hence almost instantaneous feed (and minimal, if any, pressure drop upon movement of the valve between modes). In addition to rapid initiation of color flow, it has been found that the exigencies of the situation also require the ability to almost instantaneously interrupt the flow of colorant even at high throughput pressure when the color was switched from dispensing mode back to the recirculation mode. This requirement theoretically prevents the "bleeding" of color back into the manifold when the need for color ends. The standard valve assemblies used today do not effectively address this problem. As such, the near immediate start and stop of color flow has been accomplished as a result of the utilization of the particular ball valves within the current inventive method, valve assembly configuration, and dosing apparatus.

Polymeric colorants (i.e., polyoxyalkylenated colorants) such as those described in U.S. Pat. No. 4,284,279 to Cross et al., herein entirely incorporated by reference, have been used for a number of years to color polyurethane foams, including carpet underlays. Prior to the utilization of such polymeric colorants, pigment dispersions were the main source of polyurethane coloring compounds. Such dispersions have traditionally proven very difficult to handle, too viscous for use within standard injectors, highly staining and thus difficult to clean from standard injector equipment (without the need for environmentally unfriendly solvents), and very abrasive and thus potentially damaging to the delicate machinery associated with coloring polyurethane foam. As a result, polymeric colorants are widely accepted as the best materials for coloring polyurethane foam carpet underlay products.

In the past, custom blends of polymeric colorants were made ahead of time using two or more "primary" colors prior to incorporation within the target foam. The components would be mixed together using some type of agitator such as a mixer or a drum tumbler. Once the blend was of an appropriate shade it was transferred to a storage tank for further introduction within the foam substrate. Upon completion of coloring with a specific batch of polymeric colorant, the previously run color would have to be emptied from the storage tank; the tank would need to be cleaned; and then the next color to be run in the same tank would have to be charged in the tank. Cleaning of the tanks, feed lines (a.k.a. pipelines), etc., was facilitated due to the water-solubility of the polymeric colorants (particularly as compared to pigments); however, the procedures followed were still considered labor intensive and not cost efficient. The general practice was then modified to maintain a dedicated tank for each separate color (shade) that was to run. This led to a number of inefficiencies and limitations that were not desirable if a foam manufacturer was to adequately meet demands in the market place.

Polymeric colorants, such as those cited above in Cross et al., were designed to be totally miscible with one another as well as with most polyols, one of the two main ingredients used to produce polyurethane materials (isocyanates being the other). Pigment dispersions, on the other hand, are particulates dispersed in some type of liquid carrier. They require a high degree of agitation before they satisfactorily blend together to provide a uniform color. As a result, the short amount of time that the polyol and colorant are mixed in the typical foam-producing apparatus' binder pump is not sufficient to permit an adequate mixing of components to insure a single, homogeneous coloration throughout the target foam.

A configuration of this typical colorant production line for colored carpet underlay foam is depicted in FIG. 1. This standard coloring system itself generally consists of 1 to 5 "primary" color storage tanks (three of which arc depicted as 12a, 12b, 12c in FIG. 1) each feeding a stream of colorant through feed lines 13a, 13b, 13c to at least one (per feed line 13a, 13b, 13c) positive displacement spur gear pump 15a, 15b, 15c coupled to a variable speed motor/drive 14a, 14b, 14c (such as available from Viking). The motor/pump combinations 14a, 15a, 14b, 15b, 14c, 15c are typically run continuously in either recirculation or dispense mode (depending on the position of a 3-way valve 11a, 11b, 11c) to minimize the time required to spool up the motor 14a, 14b, 14c to the proper rpm and to ultimately achieve the pressure required to initiate color flow into a pre-mix manifold 8 through serially configured 3-way valves 11a, 11b,11c [and/or injectors (not illustrated)]. The throughput pressures of each line are typically measured through the utilization of pressure gauges 16a, 16b, 16c attached to each feed line 13a, 13b, 13c from the pumps 15a, 15b, 15c to each 3-way valve 11a, 11b, 11c. The typical 3-way valves 11a, 11b, 11c are air actuated and used to direct the flow of colorants from the recirculation feed lines 17a, 17b, 17c to the dispense lines (not illustrated) to the manifold 8 when color flow to the manifold 8 is required. The colorants will mix with a stream of binder composition 10 comprising the polyurethane reactants (polyol and isocyanate, as well as other potential additives). From the manifold 8, the binder composition and colorants are moved to the binder pump 9 for further and more thorough mixing of the resultant binder/colorant composition. The resultant composition is then sprayed onto a substrate (such as scrap foam, not illustrated) to produce the desired polyurethane foam carpet underlay product (not illustrated). Although this configuration has proven effective in the past, there remain a number of problems associated with this procedure which have heretofore been unresolved.

For instance, the market place demands that a polyurethane producer be able to provide shots of binder to produce dark shades as well as light shades with a variety of hues and at differing polyol flow rates. Since color is metered volumetrically, a wide range of color flow rates are required to insure low enough flow for a minor component in a light shade. In addition, the polyol flow rates can be as low as 14 kg/min and as high as 55 kg/min [color loading is generally stated in weight percent of binder (wt. %)]. As the rate at which the polyol flow is reduced so must the color rate be reduced to maintain the same wt. %. For most polyurethane products manufactured in the United States, the color delivery systems must be able to provide color flow as low a 2 grams/min and as high as 3000 grams/min or more. The rate at which color begins to flow when pumping 3000 grams/minute is generally very different than pumping 2 grams/min until the present invention is incorporated, for example. Prior to this point in time, the general approach was to use a smaller diameter line for the low flow range. Unfortunately, there are distinct limitations on such a small diameter (small bore) feed line, most notably the resultant throughput pressure drop from pumping material several feet through a small diameter line.

Furthermore, the typical valves utilized in polyurethane rebond (i.e., with the use of a binder component subsequently mixed with isocyanate) foam coloring systems have a three-way air actuated ball valve assembly (18 in FIG. 2) that is positioned approximately three to six feet from the binder composition manifold (8 in FIG. 1) (such as 11a, 11b, 11c in FIG. 1). Due to the configuration of the available ball valves, the corresponding feed lines are generally arranged serially and consecutively on the outside of the manifold (8 in FIG. 1). As provided by the representation of a standard three-way ball valve assembly 18 in FIG. 2, material metered by the pump enters the top of the three-way ball valve 19 from the storage tank feed line 20 and exits either through the recirculation side 25 or the dispense side 22 depending on how the ball is oriented. FIG. 2 depicts the ball valve 19 when it is oriented in the recirculation mode. Once it is desired to change from recirculation to dispense and back to dispense the ball valve 19 must typically rotate 180° from one side of the ball valve 19 to the other (although there are some apparati which utilize a 90° ball valve rotation) through the movement of an actuator (not illustrated) attached to an actuator pin 23 which, in turn, fits into an indentation (not illustrated) within the ball valve 19. Furthermore, the typical ball valve 19 comprises a single channel 21 to accommodate the flow of colorant to either the recirculation side 25 or the dispense side 22. This single channel 21 is configured at a right angle and thus may contribute to laminar flow problems by requiring the colorant liquid to radically change direction, thereby altering the pressure over the total liquid mass (and thus producing non-uniformity of pressures over the entire liquid colorant).

In addition to this typical 3-way valve, a device must be used to inject color away from the wall of the manifold to insure adequate subsequent mixing (i.e., to reduce the problems associated with laminar flow through a feed line having a larger diameter than the 3-way valve). Ideally, such a device should function as a check valve to maintain pressure in the line between the valve and the manifold and to stop color flow when switching from dispense to recirculation. Such devices must maintain pressure after the dispensing unit is returned to recirculation mode otherwise the pressure drops below the "cracking" pressure of the check valve spring, which will result in even longer startups which, in turn, may translate into cost overruns, potentially greater amount of off-quality colored foam, or foam containing numerous undesirable "hardness" areas. Additionally, the resultant pressure drop must be acceptable across a broad delivery range for such injectors to alleviate any other related pressure difference problems. Also, such check valves are effective in preventing binder from entering valve assembly from the manifold. As such, the check valves are prone to plugging due to the hardening of the binder in the highly restrictive space. There have been no developments providing such desired improvements or remedies to improve upon and/or correct these problems accorded the industry by the prior art.

DESCRIPTION OF THE INVENTION

It is thus an object of the invention to provide a configuration of valve assemblies around the manifold of either a color dosing apparatus for polyurethane foam products or a transfer system apparatus for polyol storage and shipment which provides efficient and even colorations in the final product with very little, if any, discolorations or waste foam. Also, an object of this invention is to provide valve assemblies which permit instantaneous switching from a recirculating component to dosing to the injector without requiring a high throughput pressure. A further object of the invention is to provide a low throughput flow rate method of coloring polyurethane foam carpet underlay with a valve assembly configuration and/or specific types of ball valves within such specifically configured valve assemblies which substantially reduce and possibly eliminate the production of undesirable areas of "hardness" attributed to production of colorant/binder coagulants within the manifold. Another object of the invention is to provide a significant improvement in coloring polyurethane foam carpet underlay over the prior art through the utilization of valve assemblies having two-channeled ball valves which allow for instantaneous on/off performance at a very wide range of throughput pressures. Yet another object of this invention is to provide a configuration of valve assemblies which substantially reduces the problems associated with turbulent flow of liquid colorants in a polyurethane foam coloring apparatus by permitting introduction of the colorant material away from the walls of the manifold (and thus potentially problematic resistance and pressure changes through the entire system).

The aforementioned configuration of valve assembly which is situated "within" a manifold and thus simultaneously in contact with both the outside surface and inside surface of the manifold (and extending into the manifold at least 5 millimeters and at most a distance equal to the radius of the manifold) to "inject" colorant away from the manifold inner walls and into the binder stream. In such a manner, better control over the amounts of colorants, particularly when blends are desired to produce specific colors or hues within the target foams underlay product, is provided which, in turn, results in lower amounts of off-quality waste foam being produced. Furthermore, this configuration permits a more accurate mixture of binder and colorant in order to substantially avoid the aforementioned problems associated with coagulation of these two components. In addition to this configuration, it has been found that coating the inside of the manifold with polytetrafluoroethane, also known as Teflon®, available from DuPont, at least partially in the areas into which the valves introduce the colorants, allows for more even flow throughout the manifold of the binder and binder/colorant mixture. The more even flow through the manifold, the less chance of stagnation of the two components (and thus lowered ability to form unwanted coagulants). Furthermore, the polytetrafluoroethane coating provides a non-stick surface within the manifold which increases the velocity of the binder/colorant along the manifold walls thereby providing a more even throughput pressure through the entire dosing apparatus. Preferably, the coating covers the entire inside surface of the manifold.

Additionally, it has been found that specifically configured ball valves provide the optimum performance for the dosing apparatus having the particular plural valve assembly configuration noted above. The individual valves may contain and/or utilize any well known type of valve, since the valve assembly configuration is the primary method of providing the aforementioned benefits in the final carpet underlay product. However, as noted previously, the best performance has been achieved through the utilization of spherical ball valves having, individually, first and second channels; wherein each channel is exclusive of the other; wherein said first channel has a first opening and a second opening, both of which are located at different locations on the spherical ball valve surface; and wherein said second channel has a first opening and a second opening, both of which are located at different locations on the spherical ball valve surface. More succinctly, these spherical ball valves permit the use of special 3-way valves, each comprising two exclusive channels that allow the valve to dispense from the bottom rather than feed from the bottom. An injector may also be used with this valve assembly, but is has not been found to be required for the dosing apparatus to function as intended within the inventive method. Thus, with or without an injector, each desired valve assembly provides instantaneous flow regardless of the flow rate. In addition, this specific 3-way valve with the specific spherical ball valve noted above, substantially reduces, if not eliminates, the amount of leakage resulting from the movement of the ball valve from dispense to recirculation mode, or vice-versa. Thus, the specific ball valve facilitates an instantaneous on/off switching between a dispensing feed line to an injector unit and a feed line to a recirculation assembly (to reduce the amount of colorant potentially wasted and to best insure the throughput pressure of the entire apparatus remains uniform at all times).

In particular, this ball valve comprises two exclusive channels, one of which is positioned to direct the flow of colorant to the recirculation assembly and the other to direct such a flow to the injector. This is accomplished by having the two separate channels be aligned on totally separate axes (for instance, one on the x-axis and the other on either the y- or z-axis). More specifically, the channel not on the x-axis must enter the spherical ball valve at a point referenced as 0° on the particular axis and exits the spherical ball valve at a point 90° on the same axis. In this maimer, the two channels are completely exclusive of another, thereby facilitating movement of the valve between recirculation and dispensing modes. Furthermore, the configuration of the non-x-axis channel reduces the change of pressure on the liquid colorant through the valve than with a standard right angle bending channel (it provides a sort of shunt). Again, such a ball valve has proven to be highly effective in providing the necessary instantaneous on/off (color response) times as well as maintaining the proper flow rate (at an extremely wide range from about 0.3 g/min to about 14,000 g/min).

An actuator is utilized, generally, to rotate this ball valve into these specific positions. Such an actuator includes a pin extending into the valve assembly, the end of which pin is shaped to fit an indentation in the ball valve. The actuator then turns the ball valve the requisite number of degrees to align the respective channel to the desired feed line (90° is preferred, although, in some instances, 180° may be possible). Preferably, the ball valve channel and the optional injector would possess the same bore size.

Furthermore, it is important to note that production of environmentally unfriendly waste (off-quality) colored polyurethane foam carpet underlay has been caused by delayed colorant flow (throughput flow rate), pressure drop, turbulence problems (which themselves are attributed to disruption of laminar flow through the manifold), uneven colorant introduction into the binder, and the colorant dispensing feed line (to the injector), and the injector within standard polyurethane foam carpet underlay coloring apparati, and the like. The inventive configuration of a plurality of valve assemblies, as well as the polytetrafluoroethane manifold coating, and the specific spherical ball valve noted above, have all proven successful in curing and reducing the deleterious effects of these problems. For instance, with regard to the ball valves, standard three-way valves utilize ball valves comprising single channels for directing colorants. In general, these channels are formed in such a way to require a right angle turn of the colorant liquid through the valve assembly either to the injector feed line or to the recirculator feed line (see FIG. 2 and discussion thereof, above). Such a change of direction potentially increases the turbulent flow problems associated with the movement of liquid colorants through feed lines (since the flow of discrete portions of the liquid material will not be substantially uniform) and can subsequently result in deleterious pressure changes which, again, can result in off-quality foam production. The inventive ball valve assembly has provided a means to avoid all of these problems and potentially damaging circumstances, particularly where the bore size of the channels of the ball valve and the feed line through the injector and to the manifold are also substantially the same.

Also, a plurality of valves on the outside of the manifold within the foam-producing apparatus permits the introduction simultaneously of different polymeric colorants into the binder stream. As noted previously, the ability to simultaneously "inject" colorants from different valve permits better production of more pleasing shades of color through mixing at the same location equidistant from the binder pump mixing head.

Thus, the invention permits a substantial reduction (almost total elimination) of waste carpet underlay foam upon the utilization of (i) valve assemblies which more definitively and thoroughly feed colorant into the binder stream itself, (ii) simultaneously feeding valve assemblies for introduction of polymeric colorants (through the configuration of plural valve assemblies noted above), (iii) very low, but highly desirable, flow rates through the dosing mechanism (which also allows for the utilization of an extremely wide range of flow rates without an appreciable pressure drop through the entire apparatus), (iv) a polytetrafluoroethane coating on at least a portion of the inside surface of the manifold to increase the velocity of the binder/colorant along the walls of the manifold and to reduce the stagnation of binder and colorant together for an undesirable and appreciable amount of time within the manifold, and the like. Additionally, a method of coloring such polyurethane foam carpet underlay products utilizing a dosing mechanism comprising the specific valve assembly configuration within a manifold is encompassed within this invention. Furthermore, the arrangement of valve assemblies disposed radially around the circumference of a manifold as discussed above, and the resultant colored polyurethane foam carpet underlay product are encompassed within the instant invention.

The term "polyurethane foam carpet underlay product" is a well known description of cured polyurethane foam, made from the reaction of polyols and isocyanates, which is uncolored and fed through a coloring apparatus in its bulky foamed state and which is ultimately used as a carpet underlay for cushioning. It is again noted that any colored polyurethane product or colored polyol composition may be produced with the inventive apparatus and carpet underlay (as well as other foam articles) are the most preferred.

BRIEF DESCRIPTION OF THE DRAWINGS

As FIGS. 1 and 2 were fully discussed above and are not part of the preferred embodiment for this invention, the remaining drawings shall be the only ones discussed in this section.

FIG. 3 is a schematic cross section of the preferred manifold on which three valve assemblies are disposed in a radial configuration.

FIG. 4 is a schematic cross section of the preferred spherical ball valve sliced through its y-axis.

FIG. 5 is a schematic cross section of the preferred valve assembly.

FIG. 6 is a side-view diagram of the preferred coloring mechanism and procedure utilizing the preferred valve disposed on the outside of the manifold. Such a diagram only exhibits two valve assemblies due to the difficulty in drawing the accompanying machinery and feed lines with more than two valves to be disposed on the manifold. In actuality, three such valves (and accompanying machinery) are preferred as is presented in FIG. 3, above.

DETAILED DESCRIPTION OF THE
PREFERRED EMBODIMENTS INCLUDING
THE DRAWINGS

The manifold 24 in FIG. 3, is cylindrical in shape. Three valve assemblies 26a, 26b, 26c are arranged radially around the circumference of the manifold 24 which introduce colorant at injection points 34a, 34b, 34c, which are located at positions well inside the manifold 24 [here about 1 centimeter, but possibly from about 5 millimeters and up a distance equal to the radius of the manifold 24, if there is only one valve assembly present on the manifold or if a plurality of valve assemblies are present and configured serially (as in FIG. 1, discussed above); standard manifolds are about 2 inches in diameter, having thus a 1-inch radius] into the binder composition stream within the manifold 24. Preferably, the inside surface of the manifold is coated with a non-stick coating, such as polytetrafluoroethane (Teflon®) in order to reduce the build-up or stagnation of colorant and binder composition within the manifold 24. This reduces the potentially deleterious effects attributed to laminar flow of the colorant and binder. In particular, the non-stick coating is at least applied at the actual injection points 34a, 34b, 34c for the colorants. The valve assemblies 26a, 26b, 26c each comprise motors 28a, 28b, 28c to drive the actuators 30a, 30b, 30c which move the individual preferred spherical ball valves (not illustrated) between their dispense and recirculation modes. The actuators 30a, 30b, 30c comprise, as noted above, pins (not illustrated) which are attached to the motors 28a, 28b, 28c and thus can be adjusted according to the mode desired. The ball valve (not illustrated) thus may permit the transfer of colorant to a recirculation line 36a, 36b, 36c for reintroduction into a storage tank (not illustrated), which may then transfer the colorant back into the valve assembly 26a, 26b, 26c for potential dispensing into the manifold 24. The dispense line 32a, 32b, 32c thus leads to the manifold 24 and, through the injector points 34a, 34b, 34c, the colorant is introduced into the binder composition in the manifold 24. From the manifold 24 the binder/colorant composition is then moved to a binder pump assembly (not illustrated) for further mixing of the binder/colorant composition, and subsequently to a spray assembly (not illustrated) where the composition is sprayed onto, for instance, scrap foam, as a substrate on which the binder/colorant composition ultimately becomes polyurethane foam itself. The product thus is properly used as a carpet underlay, exhibits even colorations throughout, and does not exhibit any areas of "hardness" throughout the entire body of the product.

The spherical ball valve 40 of FIG. 4, which may be made from stainless steel (preferably), titanium, carbon steel, and the like, comprises a first channel 42 which runs through the entire sphere on one single axis (the x-axis, for instance) and at a specific angle (such that the entire channel 42 is located at 0° on the x-axis). The ball valve 40 also comprises a second channel 44 which runs through the entire sphere which has a passage with an entry port on the y-axis and a second entry port on the z-axis, wherein the passage lies on the yz plane. Through this configuration, and within a valve assembly (41 of FIG. 5), the first channel 42 permits flow of the liquid colorant (not illustrated) through the valve 40 to a recirculation feed line (58 of FIG. 5) when aligned with the inlet feed line (52 of FIG. 5) from a storage tank (72a, 72b of FIG. 6). Upon rotation of 90° by the utilization of a actuator pin (60 of FIG. 5) attached to an actuator (62 of FIG. 5) engaged with a properly shaped indentation (not illustrated) located at the point 270° on the y-axis in and of the ball valve 40, the first channel 42 is disengaged from all of its corresponding feed lines (52, 58 of FIG. 5) and permits the flow of liquid colorant (such as polymeric colorants, not illustrated) through the ball valve 40 (43 of FIG. 5) and into the dispensing feed line (64 of FIG. 5). The bore of each channel 42, 44 is the same for each; however, tile actual size of both bores in said channels 42, 44 may be of any size as long as they are the size as the bore of the inlet feed line (52 of FIG. 5), the recirculation feed line (58 of FIG. 5), and the dispensing feed line (64 of FIG. 5). The ball valve 40 (43 of FIG. 5) size is merely dependent upon the amount of space between all of the feed lines (52, 58, 64 of FIG. 5) within the entire valve assembly (41 of FIG. 5). The dispensing feed line (64 of FIG. 5) permits the flow of the liquid colorant (not illustrated) into the manifold (24 of FIG. 3) through any type of transferring means [such as, for example, an injector (not illustrated)].

FIG. 6 thus incorporates a potentially preferred valve assembly (41 of FIG. 5) into the entire polyurethane foam carpet underlay coloring apparatus and procedure. The colorant is transported from a storage tank 72a, 72b to at least one positive displacement spur gear pump 74a, 74b on each feed line 85a, 85b coupled to a variable speed motor/drive 76a, 76b (such as available from Viking). The motor/pump combination 74a, 76a, 74b, 76b is run continuously in either recirculation or dispense mode (depending on the position of the 3-way valve 78a, 78b). In dispense mode, the colorant flows through the valve 78a, 78b into a manifold 68. The throughput pressure is measured through the utilization of a pressure gauge 84a, 84b attached to the feed line 85a, 85b from the pump 74a, 74b to the 3-way valve 78a, 78b. The 3-way valve 78a, 78b is air actuated (although any other type of actuator may be used) and directs the flow of colorant from the recirculation feed line 86a, 86b to the dispense feed line to the manifold 68 when color flow to the manifold 68 is desired. From the manifold 68, the binder/colorant composition is moved to a binder pump 70 to mix the composition thoroughly and then further on to a spraying assembly (not illustrated) to spray the resultant colored binder composition onto a substrate to form the target polyurethane foam composition that can subsequently be cut into a carpet underlay article (not illustrated). Such a carpet underlay (not illustrated) can then be rolled and stored until unrolled and cut to conform to the shape of a carpet piece (not illustrated). The carpet underlay (not illustrated) can then be placed on a floor and the carpet piece (not illustrated) may then be placed over the carpet underlay (not illustrated) to provide cushioning, soft feel, durability, and the like for the user.

There are, of course, many alternative embodiments and modifications of the present invention which are intended to be included within the spirit and scope of the following claims.

What we claim is:

1. A method of producing a colored polyurethane article comprising the steps of
   (a) providing a binder composition comprising at least one polyol and at least isocyanate within a manifold, having an inside and outer surface, attached to a valve assembly, wherein said valve assembly is oriented such that it is simultaneously in contact with both said inside and outer surfaces of said manifold;
   (b) introducing a liquid colorant into said valve assembly including a ball valve;
   (c) introducing the colorant from within the valve assembly of step "b" into said binder composition of step "a"; and
   (d) allowing said binder composition constituents to react to form the desired colored polyurethane article.

2. The method of claim 1 wherein
   said ball valve of step "b" has first and second channels; wherein each channel is exclusive of the other;
   wherein said first channel has a first opening and a second opening, both of which are located at different locations on the spherical ball valve surface; and
   wherein said second channel has a first opening and a second opening, both of which are located at different locations on the spherical ball valve surface.

3. The method of claim 2 wherein
said ball valve of step "b" is a spherical ball valve having an x-axis, a y-axis, and a z-axis;
wherein said first channel is located on said x-axis; and
wherein said second channel is located on either said y-axis or said z-axis.

4. The method of claim 3 wherein
said spherical ball valve comprises a first opening of said first channel at a location of approximately 0° on said x-axis and a second opening of said first channel at a location of approximately 180° on said x-axis; and
wherein said first opening of said second channel is at a location on said y-axis and said second opening of said second channel is at a location on said z-axis.

5. The method of claim 4 wherein
said first and second channels of said spherical ball valve are straight and have the substantially the same bore size.

6. A colored polyurethane carpet underlay produced by the method of claim 5.

7. A colored polyurethane carpet underlay produced by the method of claim 5.

8. A colored polyurethane article produced by the method of claim 4.

9. A colored polyurethane carpet underlay produced by the method of claim 4.

10. A colored polyurethane article produced by the method of claim 3.

11. A colored polyurethane carpet underlay produced by the method of claim 3.

12. A colored polyurethane article produced by the method of claim 2.

13. A colored polyurethane carpet underlay produced by the method of claim 2.

14. A colored polyurethane article produced by the method of claim 1.

15. A colored polyurethane carpet underlay produced by the method of claim 1.

* * * * *